United States Patent

[11] 3,625,382

| [72] | Inventor | Walter R. Stanley |
| | | Rte. 1, Box 150, Kountze, Tex. 77625 |
| [21] | Appl. No. | 834,820 |
| [22] | Filed | June 19, 1969 |
| [45] | Patented | Dec. 7, 1971 |

[54] ATTACHMENT FOR TRACTORS
4 Claims, 5 Drawing Figs.

[52] U.S. Cl. .................................................. 214/147 G,
294/88, 294/106
[51] Int. Cl. ...................................................... B66c 3/16
[50] Field of Search ........................................... 214/147,
147 G; 294/88, 106

[56] References Cited
UNITED STATES PATENTS
2,840,254  6/1958  Bevan........................... 214/147 G
3,421,791  1/1969  Lindqvist...................... 294/106 X FOREIGN PATENTS
636,874  2/1962  Canada ........................ 214/147 G Primary Examiner—Gerald M. Forlenza
Assistant Examiner—George F. Abraham
Attorney—Mason, Fenwick and Lawrence ABSTRACT: An attachment for tractors which includes a frame fastened to the tractor and carrying a tiltable, telescoping boom to which a bottom-opening scoop is attached. The tractor can be run adjacent overhanging structure, and by manipulation of the boom and scoop debris can be gathered from beneath the overhanging structure and then carried away for disposal. The boom may be counterweighted to facilitate operation. Fluid cylinders are used to telescope and tilt the boom and to open and close the scoop.

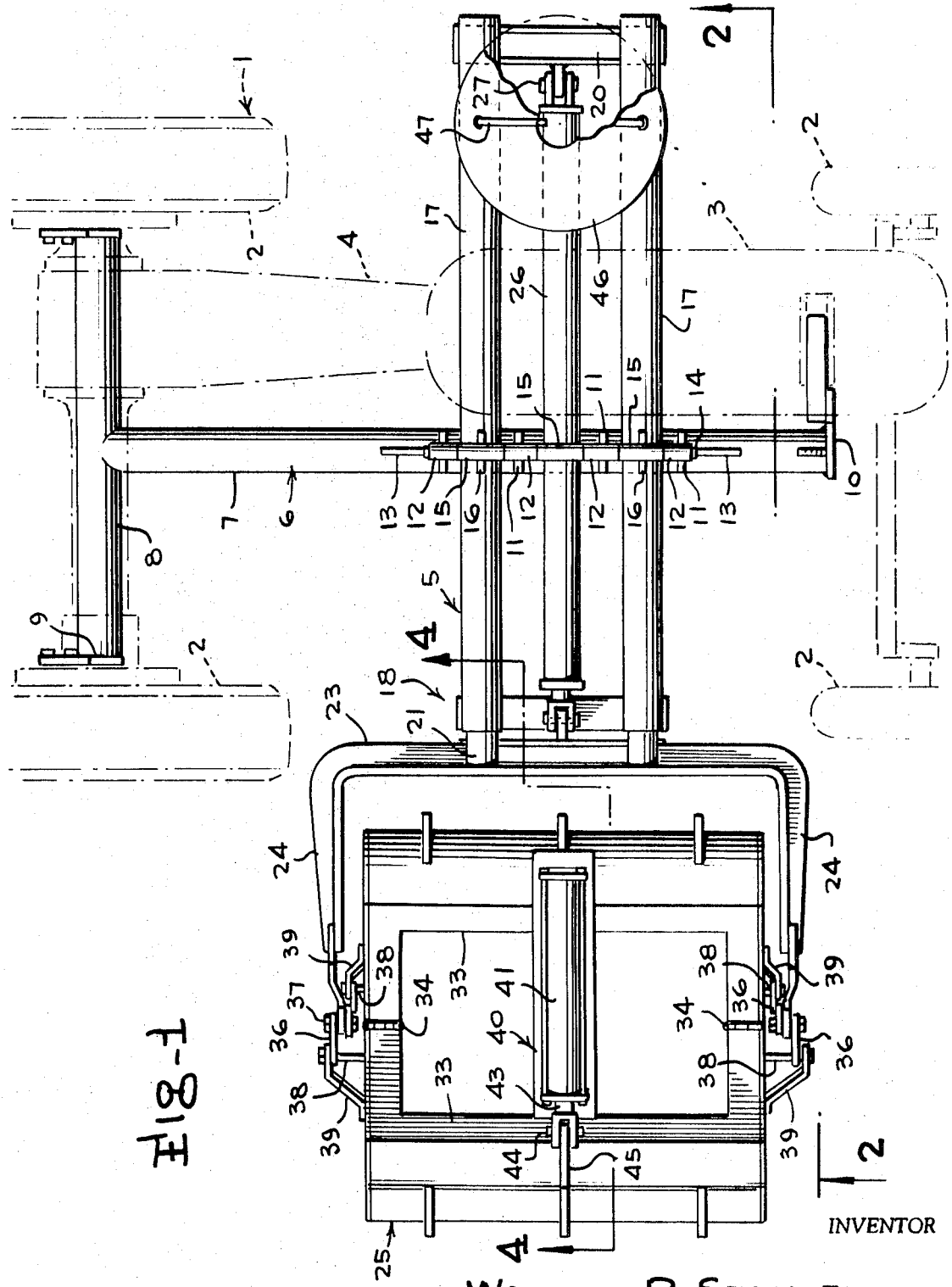

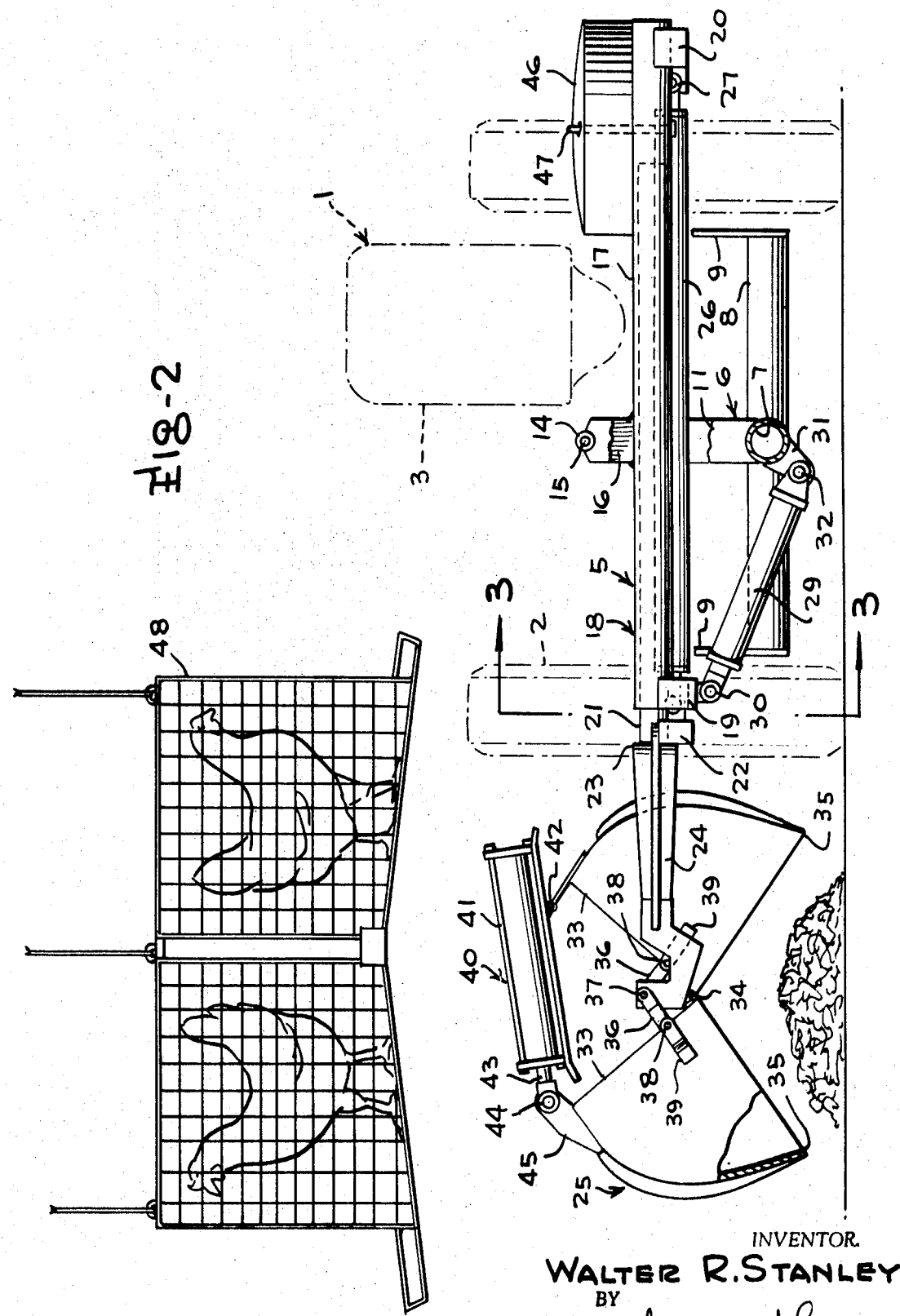

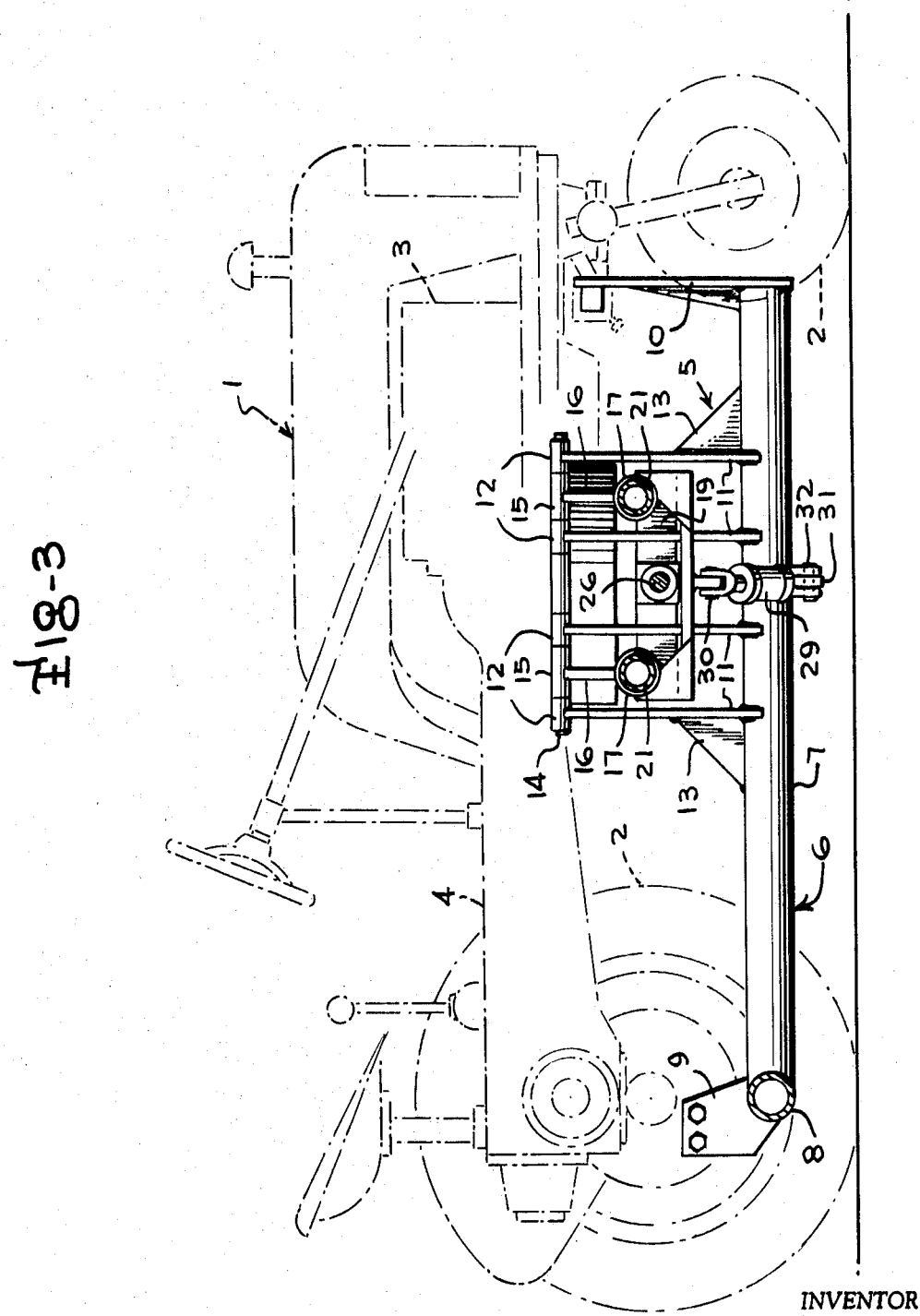

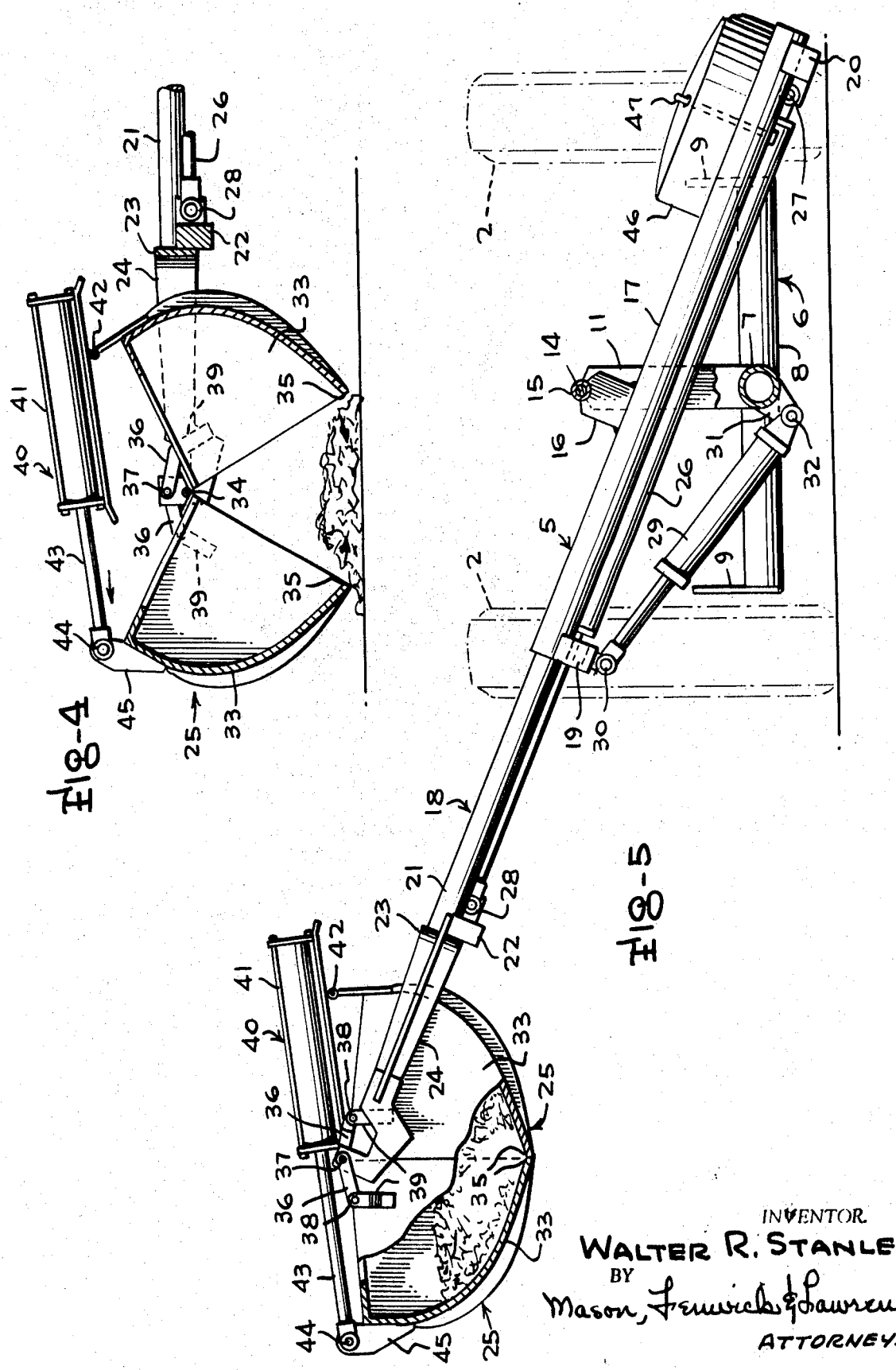

ATTACHMENT FOR TRACTORS

BACKGROUND OF THE INVENTION

This invention relates to apparatus for removing debris from floors, particularly from floor areas beneath overhanging structures which are difficult to reach with conventional means.

In present day poultry houses, cages are arranged in rows with aisles between them, and the cages are elevated above the floor for easy access by attendants. The cage bottoms are of mesh material so that droppings and other debris may fall through to the floor, to obtain cleaner, and more sanitary, cage conditions.

The cages are not high enough above the floor to permit the use of conventional mechanical means in cleaning the floor area beneath them. Consequently, the cleaning has had to be done manually. Here, again, the overhanging cages have caused difficulty, for it is necessary to bend quite low to reach all of the floor area. After the debris has been gathered from beneath the cages, it must be carried out of the poultry house and loaded onto a manure spreader or a trailer. All of this entails a great amount of effort and time.

SUMMARY OF THE INVENTION

The principal object of the present invention is to provide apparatus which can be driven into a poultry house and will clean beneath the overhead cage rows.

A more specific object is to provide an attachment for a tractor which will be capable of moving beneath the cage rows and gather, and hold, debris to be removed.

Another object is the provision of a tractor attachment including a scoop of the clamshell type with means to close the scoop members to scrape debris from the floor and, when the scoop is closed, retain it.

A further object is to provide apparatus of this type which is mounted upon a telescopic and pivoted boom to permit lifting the scoop when loaded to heights sufficient to allow emptying into a manure spreader or a trailer.

Still another object is the provision of a boom mounted scoop which is counterbalanced to reduce the power required to raise and lower it.

Yet a further object of the invention is to provide a tractor attachment of the above set out type which is hydraulically operated.

Other objects of the invention will become apparent from the following description of one embodiment thereof, when taken in conjunction with the drawings which accompany, and form part of, this specification.

BRIEF DESCRIPTION OF THE DRAWINGS

FIG. 1 is a top plan view of a tractor attachment embodying the principles of the present invention, a tractor to which it is attached being shown in dotted lines;

FIG. 2 is a vertical section through the attachment, taken on the line 2—2 of FIG. 1, and showing the device in operative position with respect to overhanging poultry cages;

FIG. 3 is another vertical section, taken on the line 3—3 of FIG. 2;

FIG. 4 is a vertical section through the scoop and associated parts, taken on the line 4—4 of FIG. 1; and FIG. 5 is a view similar to FIG. 2, but with the scoop closed and the boom elevated and extended to put the scoop in dumping position.

DESCRIPTION OF THE PREFERRED EMBODIMENT

The invention concerns an attachment for tractors, which can be removably, or permanently, connected to the tractor. The tractor can by of any type, but should be small enough to pass through the aisle of a conventional poultry house, and preferably permit its wheels on one side to run beneath the overhanging cages.

A tractor 1 has been shown of the type which has small wheels 2, and the engine 3 and drive mechanism housing 4 are offset to one side of the centerline between the wheels. Thus, the higher parts of the vehicle can be in the house aisle while the offset wheels can run beneath the cages.

The attachment 5 is mounted upon a T-shaped frame 6 having a longitudinal tubular member 7 and a transverse tubular member 8 at the rear. The ends of the member 8 are shown attached by brackets 9 to the drive mechanism housings of the tractor rear wheels, and the front end of the member 7 is shown connected to the tractor front end assembly by a bracket 10.

At approximately midway between the tractor front and back wheels, the longitudinal frame member 7 carries a plurality of vertical brackets 11, the brackets being spaced longitudinally of the member and each having a sleeve bearing 12 at its top. Suitable gussets 13 may be used to brace the brackets. A pivot pin 14 is mounted in the aligned sleeves 12. Additional bearing sleeves 15 are mounted on the pin 14, intermediate the sleeves 12, and each carries a depending mounting bracket 16 connected to a fixed cylinder 17 of a telescopic boom 18. There are two cylinders 17 in horizontally spaced, parallel relation, joined at their forward ends by a crosshead 19 and at their rear ends by a tie bar 20. Thus, the two members form a unitary boom member, mounted for tilting movement about the pivot pin 14.

Slidably mounted in the fixed cylinders 17 are telescoping boom members 21. These are jointed by a crosshead 22 and a yoke 23, which has spaced, forwardly extending arms 24 between which a scoop 25 is attached.

The boom is elongated and retracted by means of a fluid cylinder 26, having its cylinder attached to the tie bar 20 by pin 27 and its piston rod secured to the crosshead 22 by pin 28. The cylinder may be connected to any suitable pressure fluid supply in the tractor, and operated by a conventional control adjacent the tractor seat.

Tilting of the boom is accomplished by a second fluid cylinder 29, secured to the crosshead 19 by a pin 30 and to an ear 31 on the frame longitudinal member 7 by a pin 32. This cylinder also is controlled from the tractor seat.

The scoop 25 is of the clam bucket type, having bucket sections 33 hingedly connected at 34 at their adjacent top edges. The bucket sections are open toward one another, and have digging or scraping edges, or lips, 35 at their bottoms. The bucket sections are hung by means of links 36 from pivot pins 37 mounted at the ends of arms 24 of yoke 23. The other ends of links 36 are connected to pins 38, fixed at their inner ends to the bucket sections and supported at their outer ends by braces 39 attached to the bucket sections.

The scoop is actuated by means of a fluid cylinder assembly 40. The cylinder 41 is pivotally attached to one bucket section, as at 42, and the piston rod 43 is pivotally connected, as at 44, to an ear 45 extending from the opposite bucket section. Operation of the cylinder will cause the bucket sections to move to open and close the scoop. This cylinder assembly, also, may be controlled from the tractor seat.

In order to reduce the power required to move the boom, and to make the action of the boom a smoother one, a counterweight 46 is mounted upon the sections 17 of the boom on the end furthest from the scoop and on the opposite side of the pivot 14 from the scoop. A rod 47 is used to tie the counterweight to the boom sections.

In operating the apparatus, the tractor 1, mounting the attachment, will be driven into a poultry house. The boom 18 will be fully retracted and in horizontal position. The scoop will be open, and, due to the boom position, will be slightly above the floor level. The position of the parts of the attachment will be in the position shown in FIG. 2. The tractor will be moved into position with its wheels adjacent the scoop being under the row of overhanging cages 48. When the scoop is beneath the end of the cage row, cylinder assembly 29 will be operated to lower the boom to bring the scoop scraping edges 35 into contact with the floor. Cylinder assembly 40 will then be operated to move the bucket sections towards closed position. This will cause the lips 35 to scrape over the floor dragging the debris toward the center of the scoop position. When the scoop is entirely closed, the debris will be within it. Due to the fact that the bucket sections 33 are hung from the links 36, the closing movement of the scoop will maintain the scraper lips in contact with the floor over a relatively long movement. Thus, a considerable area of floor space can be scraped, and the debris picked up in one movement. If the debris which is collected by closing the scoop is not sufficient to fill the scoop, the cylinder 29 will be operated to lift the scoop slightly from the floor, the tractor will be driven forward a distance approximately equal to the scoop width and the operation will be repeated. Of course, when the scoop is open for a second scraping operation, any debris which is in it will be dropped onto the floor. However, when the scoop is again closed all of the debris which was in it originally, as well as that which has just been scraped up, will be picked up and confined within the scoop. This operation is repeated as many times as may be required to obtain a full scoop load.

When the scoop has been filled, the tractor will be driven out of the poultry house and to a manure spreader or a trailer which is to receive the material. When the tractor is in proper position, the cylinder assembly 29 will be operated to raise the boom to elevate the scoop, and, at the same time, the cylinder assembly 26 will be activated to extend the boom to its full length, or to such length as may be required to position the scoop above the body, or hopper, which is to receive it. When the scoop is in proper position, the cylinder assembly 40 will be operated to open the scoop to allow the gathered debris to drop into the receptacle.

After the material has been dumped, the tractor will be returned to the poultry house. During the return trip, the cylinder 26 will be actuated to retract the boom, and cylinder 29 will be actuated to return the boom to approximately horizontal position. By the time the poultry house is reached the apparatus will be in readiness to move to the position where the last scraping operation occurred and begin a new series of cleaning movements. When one row of the house is completed, the tractor may be turned around and the next row can be cleaned in the same manner as the first.

With this apparatus, no manual labor will be required to keep the floors beneath the cages in a clean condition. All of the area beneath the cage rows can be reached, as the tractor wheels can run beneath the cages and some adjustment of the scoop position can be made by proper manipulation of the tractor. Obviously, the boom can be extended or retracted as required to properly position the scoop with respect to the debris which is to be picked up.

Little power is required to operate the device due to the use of the counterweight to balance the boom and scoop. The only time that additional power will be required is when the boom is extended and the lever arm ratio between the scoop arm and the counterweight arm is changed. As this only occurs during the dumping operation, sufficient power can be obtained with a hydraulic system operated by a small tractor.

While the attachment could be arranged in other positions, the side mounting of the boom is quite advantageous as it permits the tractor to make a straight run through the poultry house in cleaning beneath each row.

While in the above one practical embodiment of the invention has been disclosed, it will be apparent that the particular structure shown and illustrated is merely by way of example, and other arrangements might be made to accomplish the same results.

What is claimed is:

1. An attachment for tractors comprising, a frame with means for connection to the tractor, horizontal pivot means carried by the frame, a telescopic boom mounted on the pivot means for vertical tilting movement in a plane transverse to the tractor when the attachment is mounted on a tractor, a scoop having two, pivotally connected bucket sections with bottom scraping edges positioned adjacent the tractor when the boom is retracted, links having a common pivotal connection to the boom and separate pivotal connections to the scoop bucket sections with the pivot for the link in each bucket section being spaced from the bucket sections pivotal connection a distance equal to the length of the link connected to it, a counterweight mounted on the boom on the opposite side of the boom pivot means from the scoop, means to extend and retract the telescopic boom, means to tilt the boom about the pivot means, and means to move the scoop bucket sections toward and from one another to open and close the scoop.

2. An attachment for tractors as claimed in claim 1 wherein, the means to extend and retract the boom, the means to tilt the boom, and the means to move the scoop bucket sections are fluid operated cylinder assemblies.

3. An attachment for tractors as claimed in claim 2 wherein, the boom includes a main member composed of horizontally spaced cylinders connected to the pivot means, and a telescoping section having rods slidable in the cylinders and having a yoke connected to their outer ends, the scoop bucket sections being connected to the yoke.

4. An attachment for tractors as claimed in claim 3 wherein, the fluid cylinder assembly to extend and retract the boom is connected to the main boom member and the telescoping section, the fluid cylinder assembly to tilt the boom is connected to the frame and the main boom member, and the fluid cylinder assembly to move the scoop bucket sections.

* * * * *